Z. CORBEAU.
SALVAGING DEVICE FOR AUTOMOBILES.
APPLICATION FILED MAR. 23, 1918.
1,324,232.
Patented Dec. 9, 1919.
3 SHEETS—SHEET 1.
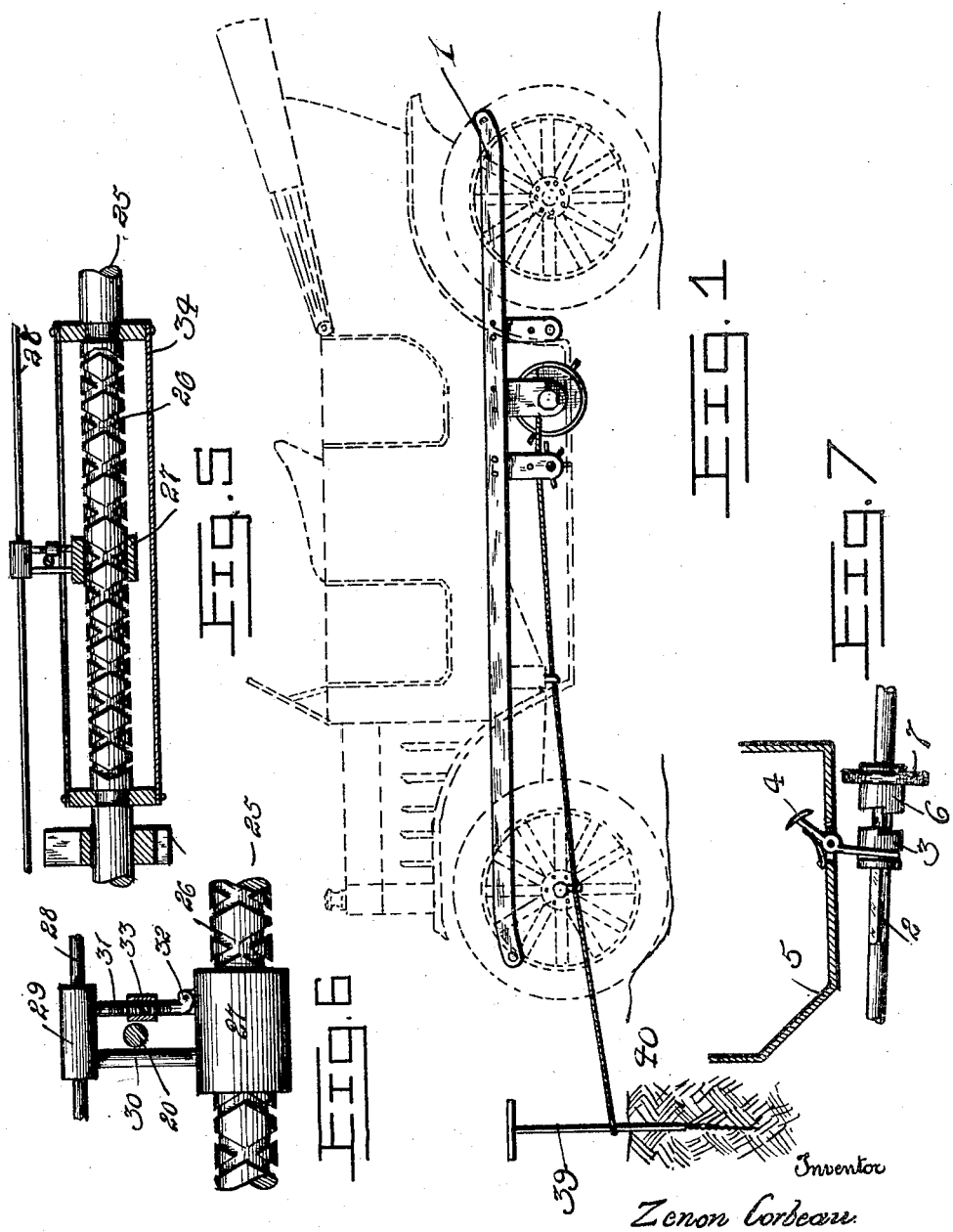

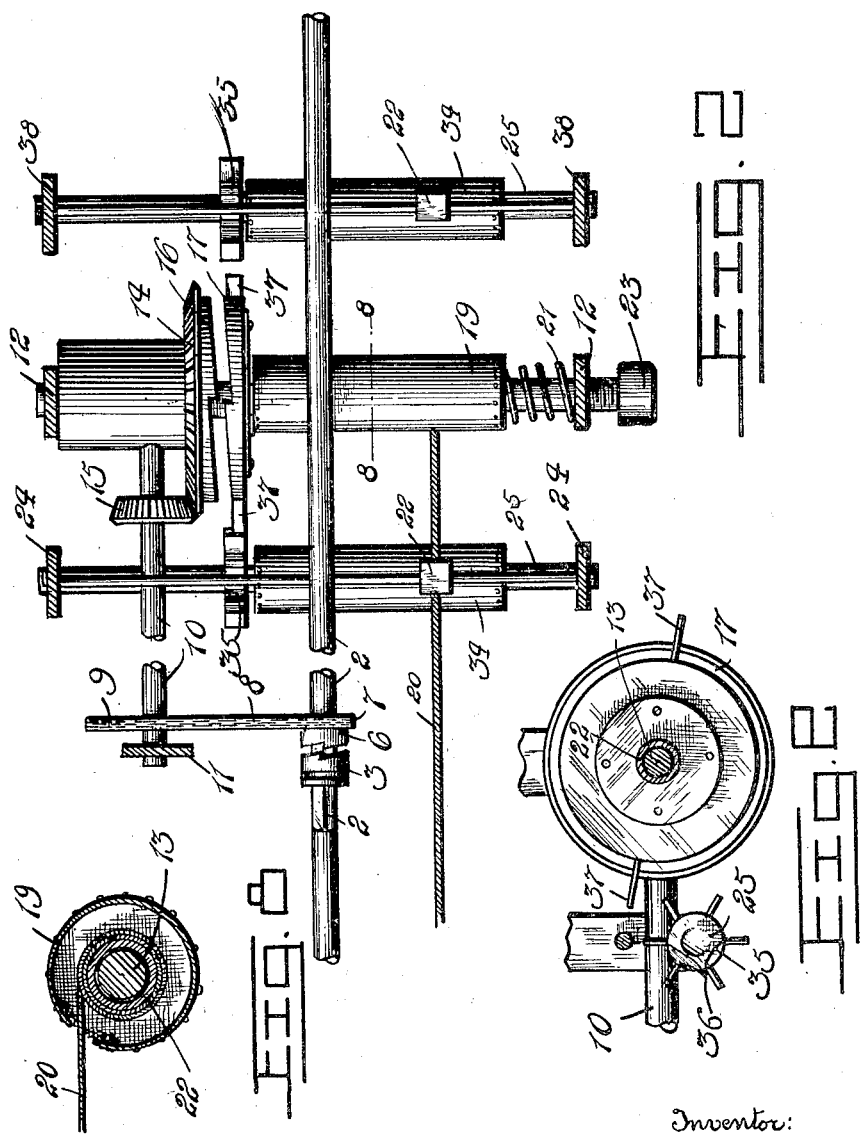

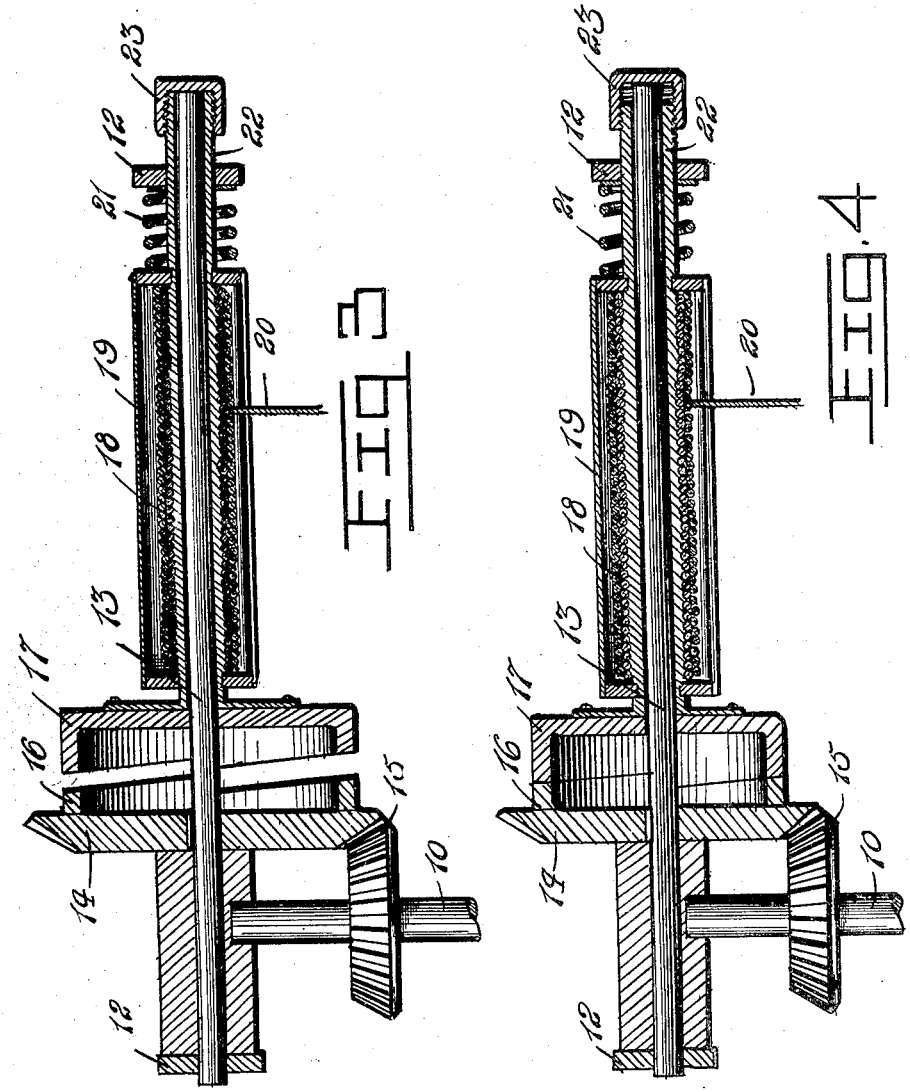

UNITED STATES PATENT OFFICE.

ZENON CORBEAU, OF MONTREAL, QUEBEC, CANADA.

SALVAGING DEVICE FOR AUTOMOBILES.

1,324,232.   Specification of Letters Patent.   Patented Dec. 9, 1919.

Application filed March 23, 1918.   Serial No. 224,148.

*To all whom it may concern:*

Be it known that I, ZENON CORBEAU, a subject of the King of Great Britain, residing at Montreal, Province of Quebec, Canada, have invented certain new and useful Improvements in Salvaging Devices for Automobiles; and I do hereby declare that the following is a full, clear, and exact description of the invention, such as will enable others skilled in the art to which it appertains to make and use the same.

The present invention relates to devices for salvaging automobiles or devices which will afford a means for pulling the automobile out of a rut or hole within the road over which the automobile is traveling.

An object of the present invention is to provide an apparatus which may be easily and readily applied to automobiles now in use and one which may be easily and readily brought into operation for pulling the automobile over the ground.

With the above and other objects in view which will hereinafter appear as the description continues, the invention consists of the novel features of construction, combination and formation of parts as will be hereinafter more fully described and particularly pointed out in the appended claim.

In the accompanying drawings has been shown a simple and preferred form of the invention, it being, however, understood that no limitation is necessarily made to the precise structural details herein exhibited, but the right is hereby reserved to any changes, alterations or modifications to which recourse may be had that come within the scope of the claims without departing from the spirit of the invention or sacrificing the efficiency of the same.

In the accompanying drawings:

Figure 1 is a side elevation of an automobile showing the invention applied thereto;

Fig. 2 is a plan view of the apparatus embodying the present invention;

Fig. 3 is a detail vertical section through the winding drum;

Fig. 4 is a similar view when the winding drum is operatively connected to the driven shaft;

Fig. 5 is a detail sectional view of the cable guiding apparatus;

Fig. 6 is an enlarged detail view of the same;

Fig. 7 is a sectional view through the foot board of the automobile frame illustrating the clutch connection between the engine shaft and the driving mechanism of the apparatus;

Fig. 8 is a detail section taken on the line 8—8 of Fig. 2; and,

Fig. 9 is a detail view of the timing mechanism between the cable winding apparatus and the cable guiding apparatus.

Referring now more particularly to the accompanying drawings wherein like and corresponding parts are designated by similar reference characters throughout the several views.

The numeral 1 indicates the framework of an ordinary automobile from which the device embodying the present invention is suspended. The numeral 2 indicates the drive shaft of the automobile which connects the engine with the differential and slidably mounted upon this shaft 2 is a clutch member 3. This clutch member 3 is adapted to be moved upon the shaft 2 by means of the foot pedal 4 which extends up through the foot board of the frame of the automobile. Loosely mounted upon this shaft 2 is the other clutch member 6 which has formed therewith a sprocket wheel 7 and this sprocket wheel is connected by means of the sprocket chain 8 to a sprocket wheel 9 keyed to the shaft 10 and the latter is journaled within the bearings 11, suspended from the frame 1. Also suspended from the frame 1 are the bearings 12 and journaled within these bearings 12 is a shaft 13. Keyed to this shaft 13 is a bevel gear 14 and this bevel gear 14 is adapted to mesh with a bevel gear 15 keyed to the shaft 10. This bevel gear 14 has formed therewith one member 16 of a clutch and slidably and loosely mounted upon the shaft 13 is the other member 17 of the clutch. Also journaled upon the shaft 13 is a winding drum 18 and this drum is connected to the clutch member 17. Inclosing this winding drum is a suitable cover 19, which may be made of canvas or any other suitable dust preventing material and adapted to be wound upon the drum 18 and extend through a longitudinally extending slot formed within the cover 19 is a cable 20. Encircling the shaft 13 is a coil spring 21 which is arranged between the drum 18 and one of the bearings 12 so that a pressure may be exerted upon the drum 18, whereby the clutch members 16 and 17 may be brought into engagement. The drum 18 is provided with an extension 22 which also encircles the shaft 13 and projects at one side of the bearings 12 and adjustably mounted upon this extension is a cap 23. This cap is arranged at one side of the automobile just below the engine board whereby ready access may be gained thereto, so that the drum 18 and the clutch 17 carried thereby may be adjusted laterally and in this manner the clutch member 17 may be thrown into and out of engagement with the clutch member 16.

Also suspended from the frame 1 are the bearings 24 and these bearings have journaled therein a shaft 25. This shaft 25 has a portion thereof which is provided with the spiral grooves 26 and slidably mounted upon this portion of the shaft is a collar 27 carrying lug projections which are adapted to rest within the grooves 26. Arranged above the shaft 25 is a rod 28 and adapted to slide upon this rod 28 is a sleeve 29 and this sleeve is connected to the collar 27 by means of the spaced rods 30 and 31. These spaced rods permit the cable 20 to pass therethrough and thereby provide a guide for the cable. The rod 31 is made of two sections, one section of which is rigidly connected to the collar 29 whereas the other section is pivotally connected as at 32 to the collar 27. These sections are detachably connected by means of the threaded sleeve 33, and it is obvious from this construction that the pivotally mounted section may be opened when the sleeve 33 releases the same, so that the cable may be removed from the guide. Encircling the grooved portion of the shaft 25 is a dust-proof casing 34 which may also be made of cloth or other suitable material. This casing is provided with a slot extending throughout its length so that the guide may pass through said slot.

As better shown in Fig. 9 of the drawings, the shaft 25 is provided with a roller 35 carrying a plurality of projections 36. The clutch member 17 carried by the shaft 13 is provided with lugs or projections 37, so that upon the rotation of the shaft 13 the lugs 37 will strike the lugs 36 and cause the shaft 25 to rotate, and as this shaft 25 rotates the collar 27 will be caused to traverse the same and by so moving upon the shaft 25, the guide carrying the cable 20 will cause the cable to be properly wound upon or unwound from the drum 18. Also suspended from the frame 1 are the bearings 38 which have journaled therein a shaft of the same construction as that of the shaft 25. A cable guide member of the same construction as that disclosed in front of the drum 18 is operated from the shaft, so that when the cable 20 extends from the rear of the automobile it will also be properly guided when being wound upon or unwound from the drum 18.

From the foregoing it is obvious that the apparatus as herein shown and described may be suspended from the frame of an ordinary automobile without changing or disturbing any of the operative parts of the automobile. If the wheels of the automobile have run into a rut within the road and the automobile is not able to get out of such a rut under its own power, then the operator may place a peg or post 39 within the ground 40 in front or at the rear of the automobile, according to the direction in which it is desired that the automobile should be pulled. One end of the cable 20 should then be securely connected to the post 39 and as the engine of the automobile is still running the operator may press upon the clutch pedal 4, thereby operatively connecting the motor shaft with the shaft 10 and cause this shaft 10 to be rotated. By suitably adjusting the cap 23 along the extension 22 of the drum 18 the clutch members 16 and 17 will be brought into engagement and as the shaft 10 is being rotated the drum 18 will then be caused to revolve. As the drum 18 is rotating, a pull will be exerted upon the cable 20 and the automobile drawn over the ground. By providing the clutch members 16 and 17, it is obvious that they will not be brought into operative engagement without adjusting the cap 23 and this obviously provides a safety attachment, as in driving the automobile the operator is likely to press upon the foot pedal 4 and bring the clutch members 3 and 6 into operative engagement when it is not desired to bring the apparatus into use. When the apparatus is to be brought into use, all that it is necessary for the operator to do is to adjust the cap 23 which is arranged at one side of the automobile just below the foot board.

Having thus fully described my invention, what I claim as new and desire to secure by Letters Patent is:

A salvaging device for motor driven vehicles including in combination with the drive shaft thereof, a shaft mounted transversely of the vehicle chassis, a cable receiving drum operable on said shaft, a clutch element operatively connected to the drive shaft and adapted for engagement with the first clutch, said drum being adjustable and adapted for throwing the clutch elements into and out of engagement, a clutch pedally operable for controlling the connection between the drive shaft and the second clutch element, a shaft having bearings on said chassis and formed with spiral grooves, a collar mounted on said shaft having lugs adapted to rest in said grooves, another shaft above the last mentioned shaft and provided with a slidable sleeve, spaced rods connecting said collar and sleeve, and said rods forming a guide for said cable.

In witness whereof I have hereunto set my hand.

ZENON CORBEAU.